(12) United States Patent
Peterson et al.

(10) Patent No.: US 6,196,942 B1
(45) Date of Patent: Mar. 6, 2001

(54) MODULAR UNITIZED DIFFERENTIAL

(75) Inventors: Glen David Peterson, Portage; Anthony Militello, East Pointe, both of MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/461,434

(22) Filed: Dec. 16, 1999

(51) Int. Cl.[7] .................................................. F16H 48/06
(52) U.S. Cl. ......................................... 475/230; 74/606 R
(58) Field of Search .......................... 475/230; 74/606 R, 74/607

(56) References Cited

U.S. PATENT DOCUMENTS

| | | |
|---|---|---|
| 1,682,871 | 9/1928 | Short et al. . |
| 2,873,622 | 2/1959 | Nash . |
| 3,344,388 | 10/1967 | Frost . |
| 3,853,022 | 12/1974 | Duer . |
| 4,125,026 * | 11/1978 | Torii et al. .............................. 475/230 |
| 4,363,248 | 12/1982 | Brisabois . |
| 4,467,672 | 8/1984 | Lamy . |
| 5,320,587 | 6/1994 | Bodtker et al. . |
| 5,533,423 * | 7/1996 | Stehle et al. ......................... 74/606 R |
| 5,697,677 | 12/1997 | Ruppert et al. . |
| 5,791,205 | 8/1998 | Ruppert . |
| 5,806,371 | 9/1998 | Hibbler et al. . |

* cited by examiner

*Primary Examiner*—Dirk Wright
(74) *Attorney, Agent, or Firm*—Liniak, Berenato, Longacre & White

(57) ABSTRACT

A modular unitized differential for drive axles of motor vehicles includes a barrel-shaped differential case and a bowl-shaped ring gear. The ring gear is adapted to be selectively positioned relative to the differential case for fastening in a specific position in accordance with the needed gear spacing. The arrangement allows to accommodate different gear ratios between the ring gear and input gear.

9 Claims, 2 Drawing Sheets

MODULAR UNITIZED DIFFERENTIAL

BACKGROUND OF THE INVENTION

1. Field of the Invention

The present invention relates to differential transmission mechanisms, particularly a differential utilized in an automotive axle drive.

2. Description of the Prior Art

A differential gear in a final drive axle of a motor vehicle transmits a rotational input from an engine to two axle shafts. A differential case is rotatably supported on an axle housing. Typically, a differential case comprises two halves: a plain differential case half and a flanged differential case half, usually bolted to each other. The flanged differential case half is provided with a flange that receives a ring gear attached to the flange by a number of bolts. In order to provide the adequate stiffness of the differential gear, the flanged differential case half is conventionally provided with a plurality of stiffening ribs.

The ring gear is engaged with a pinion gear of a final drive. In such a case, to account for assembly tolerances, shim packs may be disposed between the ring gear and the flange of the differential case to properly align the ring gear with the pinion gear. Such prior art assemblies are costly and cumbersome.

Furthermore, presently, each model of automobile (both cars and trucks) may have variants having different final drive gear ratios for various specific applications. The different final drive gear ratios require different gear teeth combinations, thus automobile manufacturers need to provide differentials with different gear spacings (or offsets). For instance, heavy duty truck drive axle differential manufacturers have to use up to four different flanged differential case halves to cover the offsets of all gear ratios employed.

SUMMARY OF THE INVENTION

The present invention alleviates the drawbacks of the prior art. The present invention provides selective axial positioning of the ring gear relative to the differential case for welding in a specific position to accommodate different gear ratios between the ring gear and an input gear. The present invention also eliminates bolts or other complicated fastening devices to secure the ring gear to the differential case. Manufacture and assembly tolerances may also be accounted for.

The modular unitized differential in accordance with the present invention comprises a flanged differential case and a bowl-shaped ring gear having a concave flange portion. The concave flange portion of the ring gear greatly improves the stiffness and impact resistance of the differential, thus eliminating the need for the stiffening ribs. During the manufacturing of the differential, the ring gear is mounted on the differential case, selectively positioned in a specific axial position by sliding the ring gear relative to the differential case, and welded in place. This arrangement enables to accommodate different gear ratios between the ring gear and input gear.

BRIEF DESCRIPTION OF THE DRAWINGS

Other objects and advantages of the invention will become apparent from a study of the following specification when viewed in light of the accompanying drawings, wherein.

DETAILED DESCRIPTION

Figure 1:
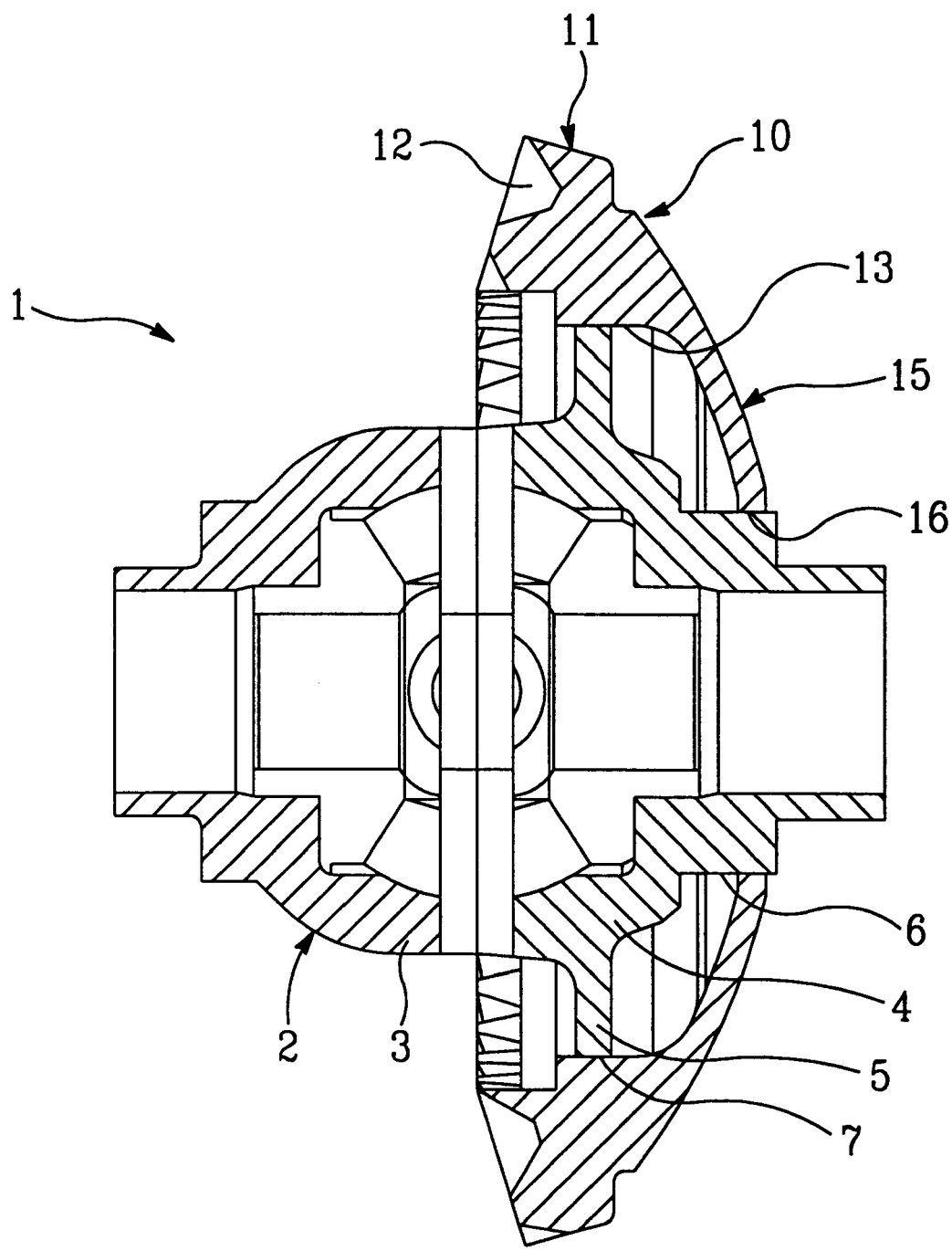
FIG. 1 is a cross-sectional view of the differential case and the ring gear assembly in accordance with the present invention.
Figure 2:
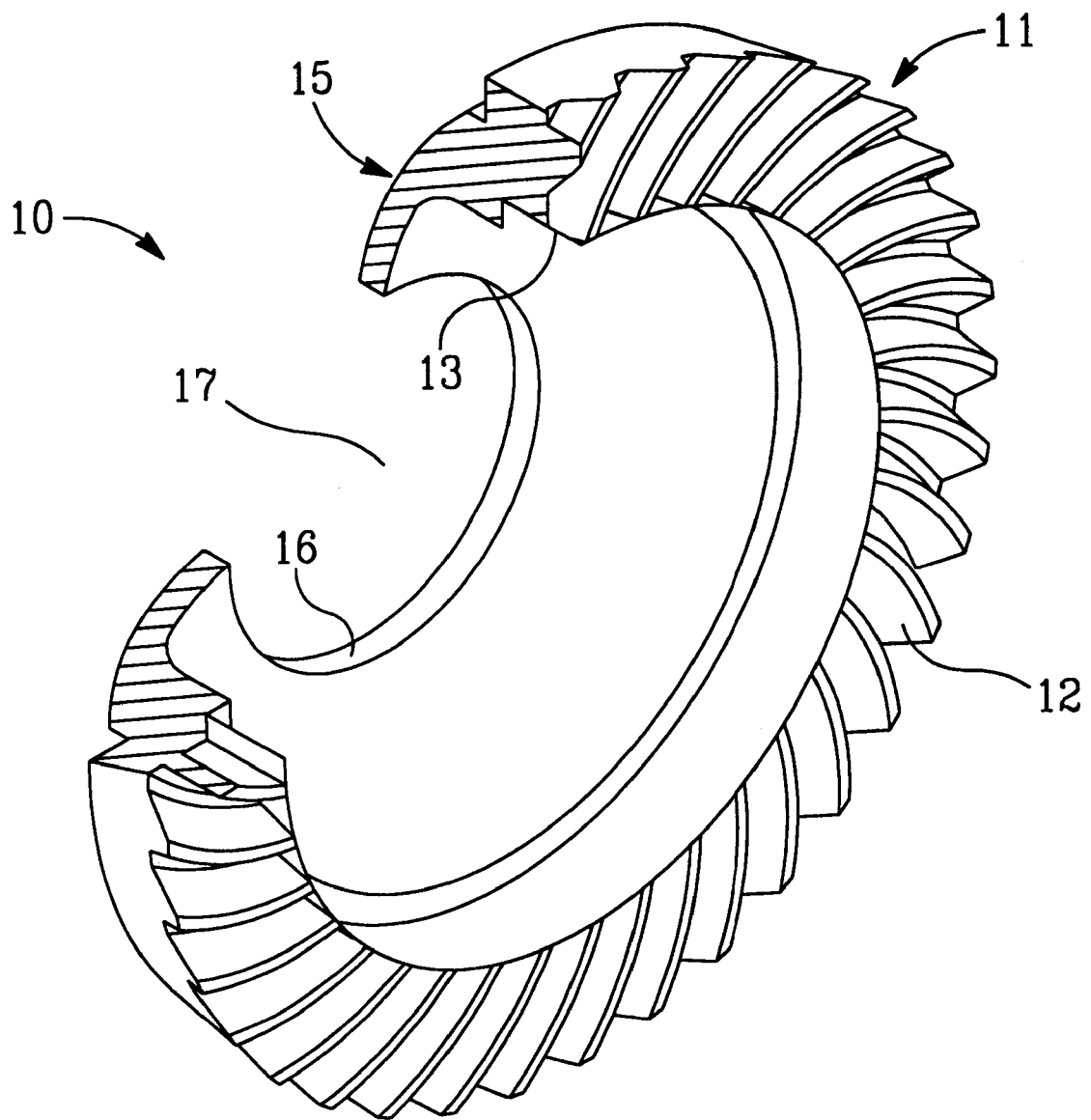
FIG. 2 is a perspective view of the ring gear.

FIGS. 1 of the drawings depicts a modular unitized differential in accordance with the present invention. The differential comprises a differential case 1 rotatably supported on an axle housing (not shown) and a ring gear 10 driven by a pinion gear (not shown) attached to a power driven propeller shaft (not shown). The differential case 1 is generally barrel shaped and includes a differential case body 2 and an external annular flange 5 extending radially outwardly from the differential case body 2. The differential case body 2 is provided with at least one external boss 6 coaxial with an axis of rotation of the differential case 1. Conventional side gears and differential pinion gears, not shown, are mounted within the differential case body 2.

In the preferred embodiment, the differential case body 2 includes two halves; a plain differential case half 3 and a flanged differential case half 4, usually bolted together. The flange differential case half 4 is provided with an external annular flange 5 extending radially outwardly from the flanged differential case half 4, and the external boss 6 coaxial with an axis of rotation of the differential case 1.

The ring gear 10 comprises an annular toothed portion 11 and a concave flange portion 15. The annular toothed portion 11 has a circular set of gear teeth 12 formed along its outer periphery, and an internal peripheral surface 13. The internal peripheral surface 13 of the annular toothed portion 11 is adapted to receive and rest upon the external annular flange 5. For this reason, an internal diameter of the internal peripheral surface 13 of the annular toothed portion 11 is substantially equal to an external diameter of an external peripheral surface 7 of the annular flange 5. The concave flange portion 15 of the ring gear 10 extends radially inwardly from the annular toothed portion 11, and is substantially concave or bowl-like in shape. In the preferred embodiment, the concave flange portion 15 is formed integrally with the annular toothed portion 11. The concave flange portion 15 greatly increases the stiffness of the differential assembly and provides support more effectively than the conventionally employed stiffening ribs, thus eliminating need for the stiffening ribs. The concave flange portion 15 is provided with an inner peripheral surface 16 defining a central aperture 17 therein. The central aperture 17 in the concave flange portion 15 is adapted to receive the external boss 6 formed on the flanged differential case half 4, and, therefore, the inner peripheral surface 16 rests upon the external boss 6. Preferably, an internal diameter of the central aperture 17 is substantially equal to an external diameter of the external boss 6.

During the assembling of the differential gear in accordance with the present invention, the ring gear 10 is attached to the differential case 1 as follows. The ring gear 10 is positioned around the body 2 of the differential case 1 with the gear teeth 12 facing the external annular flange 5 of the differential case body 2, and then advanced toward the flange 5. As a result, the inner peripheral surface 13 of the toothed portion 11 of the ring gear 10 fits over external peripheral surface 7 of the external annular flange 5, and the inner peripheral surface 16 of the concave flange portion 15 of the ring gear 10 fits over an external peripheral surface of the boss 6 of the differential case body 2. As the next step, the ring gear is selectively positioned relative to the differential case body in accordance with the needed offset by axially sliding it over the case body 2. Once the desired geometry is achieved, the ring gear 10 is welded to the differential case body 2.

While in accordance with the provisions of the Patent Statutes the preferred embodiments of the present invention has been illustrated and described, it will be apparent to those of ordinary skill in the art that various changes, modifications or variations may be easily made without deviating from the scope of the invention.

What is claimed is:

1. A modular unitized differential comprising:

a differential case provided with an annular flange having an external peripheral surface, and an outer cylindrical boss coaxial with an axis of rotation of said differential case;

a ring gear having an annular toothed portion and a concave flange portion extending inwardly from said toothed portion, said concave flange portion has a circular central aperture receiving said boss, and said toothed portion has an internal cylindrical peripheral surface receiving said exterior peripheral surface of said external annular flange, wherein said ring gear is fastened to said differential case.

2. The unitized modular differential as defined in claim 1, wherein said concave flange portion is integrally formed with said annular toothed portion.

3. The unitized modular differential as defined in claim 1, wherein said differential case comprises a plain differential case half and a flanged differential case half; said flange differential case half is formed integrally with said external annular flange and said outer cylindrical boss.

4. The unitized modular differential as defined in claim 1, wherein an internal diameter of said cylindrical internal peripheral surface of said annular toothed portion is substantially equal to an external diameter of said external annular flange of said differential case, and an internal diameter of said central aperture in said concave flange portion of said ring gear is substantially equal to an external diameter of said outer cylindrical boss of said differential case.

5. The unitized modular differential as defined in claim 1, wherein said ring gear is fastened to said differential case by welding.

6. A method for assembling a ring gear to a differential case, said method comprising the steps of:

providing said differential case having an external annular flange having an outer peripheral surface, and an outer cylindrical boss coaxial with an axis of rotation of said differential case, said boss having an outer cylindrical peripheral surface;

providing said ring gear having an annular toothed portion and a concave flange portion extending inwardly from said toothed portion, said concave flange portion having an inner cylindrical peripheral surface defining a circular central aperture therein, said toothed portion having a circular set of gear teeth and an inner cylindrical peripheral surface;

mounting said ring gear to said differential case with said gear teeth facing said external annular flange and said outer boss of said differential case to allow axial translation of said ring gear relative to said differential case in such a way that said inner peripheral surface of said toothed portion fits over said external peripheral surface of said external annular flange and said inner peripheral surface of said concave flange portion fits over said outer peripheral surface of said outer boss;

selectively positioning said ring gear relative said differential case by axially sliding said ring gear relative to said differential case;

fastening said ring gear to said differential case in a selected position.

7. A method for assembling a ring gear to a differential case as defined in claim 6, wherein said step of fastening said ring gear to said differential case in said selected position includes welding.

8. A modular unitized differential comprising:

a differential case provided with an annular flange having an external peripheral surface, and an outer cylindrical boss coaxial with an axis of rotation of said differential case; said external annular flange is formed integrally with said flanged differential case half;

a ring gear having an annular toothed portion and a concave flange portion extending inwardly from said toothed portion, said concave flange portion is integrally formed with said annular toothed portion;

said concave flange portion has a circular central aperture receiving said outer cylindrical boss;

said toothed portion has an internal cylindrical peripheral surface receiving said exterior peripheral surface of said external annular flange, wherein an internal diameter of said internal cylindrical peripheral surface of said annular toothed portion is substantially equal to an external diameter of said external annular flange of said differential case, and an internal diameter of said circular central aperture in said concave flange portion of said ring gear is substantially equal to an external diameter of said outer cylindrical boss of said differential case, and wherein said ring gear is welded to said differential case.

9. The unitized modular differential as defined in claim 8, wherein said differential case comprises a plain differential case half and a flanged differential case half; said flanged differential case half is provided with an external annular flange having an external peripheral surface, and a boss coaxial with an axis of rotation of said differential case.

* * * * *